United States Patent [19]

Ahsan et al.

[11] Patent Number: 5,178,775
[45] Date of Patent: Jan. 12, 1993

[54] COST EFFECTIVE PROCESS FOR DETOXIFICATION OF CYANIDE-CONTAINING EFFLUENTS

[75] Inventors: M. Q. Ahsan, Waldwick, N.J.; Stephen Gos, Hanau; Helmut Knorre, Seligenstadt, both of Fed. Rep. of Germany; Roy Norcross, Norwalk, Conn.; Friedrich W. Merz, Nierstein, Fed. Rep. of Germany

[73] Assignee: Degussa AG, Frankfurt am Main, Fed. Rep. of Germany

[21] Appl. No.: 669,581

[22] Filed: Dec. 17, 1990

[51] Int. Cl.$^5$ .................................................. C02F 1/72
[52] U.S. Cl. .................................... 210/752; 210/759; 210/763; 210/904
[58] Field of Search ............... 210/759, 763, 904, 752

[56] References Cited

U.S. PATENT DOCUMENTS

| 3,617,567 | 11/1971 | Mathre | 210/904 |
| 4,615,873 | 10/1986 | Devuyst et al. | 423/367 |
| 4,622,149 | 11/1986 | Devuyst et al. | 210/717 |

FOREIGN PATENT DOCUMENTS 2091713  8/1982  United Kingdom ............... 210/904

Primary Examiner—Peter Hruskoci

[57] ABSTRACT

This invention pertains to a method of treating cyanide contained in wastewater with particularly high levels of solids in the stream. The process involves either simultaneous or step-wise dosage of hydrogen peroxide in the form of an aqueous solution of a concentration between 35% to 90% by weight, preferably at least 50% by weight, and $SO_2$ either in the form of gaseous $SO_2$ or solution of sodium and/or potassium sulfite or metabisulfite resulting in the conversion of cyanide ions to non-toxic cyanate ions.

21 Claims, No Drawings

COST EFFECTIVE PROCESS FOR DETOXIFICATION OF CYANIDE-CONTAINING EFFLUENTS

BACKGROUND OF THE INVENTION

The present invention relates to a process for the detoxification of effluents containing cyanide which utilizes the addition of hydrogen peroxide and either sulfur dioxide or sodium/potassium sulfite or metabisulfite.

Wastewater from a variety of industrial processes, particularly effluents generated from leaching of gold-containing ores in gold extraction plants, usually contain cyanide in various forms, such as simple cyanide and cyanide complexed with other toxic metals. In order to prevent serious damage to the environment, especially aquatic life, and to avoid an adverse impact on public health and safety, this highly toxic cyanide must be removed and/or converted into non-toxic materials before these effluents can be discharged to waterways.

Currently, several chemical processes exist for treatment of cyanide-containing effluents. See Scott, J., "An Overview of Cyanide Treatment Methods," presented at Canadian Mineral Processors 13th Annual Meeting, Ottawa, Ontario, Jan. 20-22, 1981. One of the processes involves treatment of cyanides with hydrogen peroxide. See Knorre, H., and A. Griffiths, "Cyanide Detoxification with Hydrogen Peroxide Using Degussa Process," paper presented at the Cyanide and Environment Conference, Tucson, Ariz., 1984. In this process, the simple cyanides and heavy metals, such as copper, zinc and nickel cyanides, are oxidized to non-toxic cyanates. The hydrogen peroxide process is advantageous because it adds no new substances to the environment except for oxygen and water, unlike other processes which result in salt formation and introduction of such salts to natural waterways.

In the mining industry, particularly in the precious metal processing plants, the waste effluent often takes the form of so-called tailings pulps or slurries in which the amount of solid may be as high as 50% or even higher. A pulp or slurry is formed when an ore (solid) is thoroughly mixed with water. In treating these pulps or slurries with hydrogen peroxide, the consumption of hydrogen peroxide in some cases may be too high to be cost effective. Therefore, a process which enables detoxification of cyanide containing effluents, especially pulps or slurries, with economically viable amounts of hydrogen peroxide would be welcomed in the industry.

SUMMARY OF THE INVENTION

It is an object of the present invention to provide a process for detoxifying cyanide-containing effluents.

In one variation, the process comprises reacting an effluent with $H_2O_2$ and either gaseous $SO_2$ or an alkali/alkaline earth metal sulfite or metabisulfite. The $H_2O_2$ and the $SO_2$ or alkali/alkaline earth metal sulfite or metabisulfite may be added simultaneously to the effluent.

DETAILED DESCRIPTION OF THE INVENTION

The present invention entails the addition of $H_2O_2$ at a concentration between 35% and 90% by weight, preferably between 50% and 70% by weight, and adding gaseous $SO_2$ or alkali/alkaline earth metal sulfites (e.g., sodium, potassium and lithium), including bisulfites, metabisulfites and pyrosulfites solution, to an effluent containing cyanide. Solutions and suspensions containing cyanide can also be treated. Examples of alkali/alkaline earth metal compounds include sodium sulfite ($Na_2SO_3$) and sodium metabisulfite ($Na_2S_2O_5$). Gaseous $SO_2$ or industrial grade liquid $SO_2$ can be used. For ease in describing the invention, the use of the term "$SO_2$" or "sulfite" is meant to include all of the above compounds.

$SO_2$ may be added simultaneously with hydrogen peroxide to the effluent or it may be added in a second stage. However, if $SO_2$ is added in a second stage, then it is important to ensure that there is residual hydrogen peroxide (about 20-100 ppm) available for the efficient destruction of cyanide in the second stage.

The treatment may be carried out as either a batch or continuous process. In the batch treatment of wastewater, the wastewater is first allowed to flow, or is pumped, into a vessel fitted with some form of agitator, such as a propeller-type stirrer. The pH of the water should be adjusted between 7 and 12, preferably between 8.5 to 9.5, by addition of either an acid or base as may be necessary. Mineral acids (e.g., HCl, $H_2SO_4$) can be utilized. However, $HNO_3$ should not be used since it can act as a strong nitrating agent which may lead to adverse side effects. Inorganic bases may be utilized, including lime. The preferred acid is sulfuric acid and the base may be sodium hydroxide or calcium oxide. Hydrogen peroxide is added to the wastewater as an aqueous solution at a concentration between 30 and 90%, preferably between 50 to 70% by weight, in a stoichiometric ratio of 1:1 to 3:1 of hydrogen peroxide to weak acid dissociable cyanide. $SO_2$ is added in a ratio of 1:1 to 3:1 of $SO_2$ to cyanide. The $SO_2$ may be added simultaneously with hydrogen peroxide or it may be added 5-60 minutes after the hydrogen peroxide was added. When $SO_2$ is a gas it should be bubbled into the tank. The reactions may be accelerated by addition of a catalyst, such as copper (II) salts, especially copper (II) sulfate pentahydrate, to the same tank where $SO_2$ and $H_2O_2$ is added.

Reaction times are dependent on the cyanide concentration in the effluent. As a general rule, when $SO_2$ and $H_2O_2$ are added simultaneously, the reaction time is usually between 15-30 minutes. When $SO_2$ is added in a second stage, i.e. after the addition of $H_2O_2$, the reaction time with $SO_2$ should be between 10-15 minutes. The reactions can be conducted at ambient temperature and pressure. Heating, cooling, or pressurization is not required. The addition of oxygen is not required.

In the continuous-flow embodiment of the present invention, the wastewater or waste slurry is allowed to flow, or is pumped, through a series of reaction tanks. The reaction tanks are chosen in size and number to provide sufficient reaction time for the treatment process, which is usually between 5 minutes to 2 hours. Each tank is provided with an agitator and is of conventional construction. Conventional agitation can be utilized.

The pH is adjusted in the first tank between 7.0 and 12.0, preferably between 8.5 and 9.5, by addition of an acid or alkali as may be necessary. Mineral acids, except $HNO_3$, and inorganic bases, including lime, may be utilized. Sulfuric acid is the preferred acid while sodium hydroxide or calcium oxide are preferred alkali materials. Usually the pH does not have to be adjusted in the other tanks. After the pH has been properly adjusted, hydrogen peroxide is pumped into the reaction tank at a predetermined rate. The dosage rate of $H_2O_2$ should be determined by bench scale lab experiments. However, the average dosage rate of $H_2O_2$ is about 3 times the molar concentration of cyanide in the effluent. Usually the molar ratio between $H_2O_2$ and cyanide ($CN-$) is between 2:1 and 3:1. The $SO_2$ or other $SO_2$ generating reagents can be added either simultaneously with hydrogen peroxide in the same reaction vessel (and the reaction time is 15-30 minutes) or at a later stage (usually between 5 to 60 minutes after addition of hydrogen peroxide) into a second reaction tank. Depending on the composition of the effluent, some fresh copper ions, usually in the form of $CuSO_4.5H_2O$, may have to be added to expedite the reaction. Copper ions are added to the first reaction tank. However, copper ions may be added to the effluent in a separate tank prior to the oxidation reaction tank. If the reaction is to proceed in a reasonable time, then the effluent should contain between 20 to 50 ppm of copper ion. If the effluent already contains this amount of copper then the addition of fresh copper is not necessary. The reactions normally take place at ambient temperature and pressure. Heating, cooling, or pressurization are not required. The addition of $O_2$ is not required.

Equipment necessary for dosing $H_2O_2$ and gaseous $SO_2$ is known in the industry.

The resulting cyanates ($OCN-$), e.g. NaOCN, are completely soluble in water and are non-toxic and can therefore be conveniently discharged to the environment. The method does not form a precipitate that needs to be buried, burned or otherwise disposed of.

U.S. Pat. Nos. 4,024,037; 4,250,030; 4,312,760; and 4,615,873 are incorporated by reference for discussion of the background of the invention and methods known in the art.

The following examples serve to illustrate the present invention:

EXAMPLES

An effluent, in the form of a slurry from a gold mine in Nevada, was utilized having the following composition:

| | |
|---|---|
| Weak acid dissociable cyanide (By ASTM method) | 239.9 mg CN/l |
| Copper (by atomic absorption spectroscopy) | 187.9 mg/l |
| Iron (by atomic absorption spectroscopy) | 0.7 mg/l |
| pH | 10.9 |
| % solids | 40 |

A series of detoxification tests were performed on 500 g pulp aliquots. The resulting solutions were analyzed for weak acid dissociable cyanide ($CN_{WAD}$) by the picric acid method which is known in the art.

The results of the detoxification tests, together with dosages of hydrogen peroxide and sulfur dioxide, are shown in Table 1. In all examples (1-9) in Table 1, both $H_2O_2$ and $SO_2$ were added simultaneously.

It can be seen from Example 2 that if hydrogen peroxide alone is used, then 7.8 lbs of $H_2O_2$ (100% basis, i.e. no water) would be required to detoxify 1 lb of $CN_{WAD}$. Example 6 shows that if a combination of $H_2O_2$ and $SO_2$ is used then 1 lb of $CN_{WAD}$ can be detoxified to less than 4 ppm $CN_{WAD}$ by using 2.7 lbs of $H_2O_2$ (100% basis) together with 7.3 lbs of $SO_2$. The tables show the peroxide and $SO_2$ usage as molar ratios. These molar ratios are then converted to pounds.

Example 7 shows that increasing the dosage of $SO_2$, compared with Example 6, does not improve the detoxification. Results of Examples 6 and 7 show that efficient detoxification is limited by certain minimum amounts of hydrogen peroxide. The minimum amount of $H_2O_2$ is 2 moles of $H_2O_2$ per mole of cyanide in the effluent, i.e. 68 pounds of $H_2O_2$ (100% basis) per 26 pounds of cyanide ($CN-$) in the effluent.

Example 9 shows that $CN_{WAD}$ can be completely detoxified by using 3.03 lbs of $H_2O_2$ (100% basis) together with 6.06 lbs of $SO_2$.

A cyanide containing solution generated in the laboratory was detoxified according to the present invention using hydrogen peroxide in Stage 1 and sulfur dioxide in Stage 2. The initial concentration of weak acid dissociable cyanide was 100 ppm and the copper concentration was 60 ppm. Examples 10-18 in Table 2 shows the results of the detoxification of this synthetically generated solution.

Example 11 shows that 10.5 lbs of $H_2O_2$ (100% basis) is required to remove 1.0 lb of $CN_{WAD}$. Example 13 shows that 3.9 lbs of $H_2O_2$ (100% basis) together with 1.85 lbs of $SO_2$ is required to remove 1.0 lb of $CN_{WAD}$. These two examples demonstrate that a very substantial savings in reagent costs occurs when $H_2O_2$ and $SO_2$ are used in combination. Examples 15 and 18 show even greater savings in reagent cost.

Examples 19-28 in Table 3 show the results of detoxification of a synthetically generated cyanide solutions using hydrogen peroxide in Stage 1 and sodium sulfite ($Na_2SO_3$) in Stage 2. This solution contained 100 ppm (mg/l) of CN and also 50 ppm (mg/l) of copper ion (added as copper sulfate solution). Example 19 shows that 9.15 pounds of $H_2O_2$ (100% basis) alone is required to detoxify 1 pound of CN. Example 20 shows that 1.3 pounds of $H_2O_2$ (100% basis) alone can reduce the cyanide content from 100 ppm to 16.55 ppm. However, Example 22 shows that 1.3 pounds of $H_2O_2$ together with 9.69 pounds of $Na_2SO_3$ per pound of cyanide can reduce the cyanide content from 100 ppm to approximately 8.5 ppm. However, further increase in the amount of sodium sulfite does not improve detoxification as shown in Examples 21 to 24.

Example 25 shows that 2.6 pounds of $H_2O_2$ together with 4.84 pounds of $Na_2SO_3$ can very efficiently detoxify 1 pound of cyanide. Examples 25 and 26 show very substantial savings in hydrogen peroxide when sodium sulfite is used in conjunction with hydrogen peroxide.

Further variations and modifications of the invention will become apparent to those skilled in the art from the foregoing and are intended to be encompassed by the claims appended hereto.

TABLE 1

| EXAMPLE NO. | INITIAL $CN_{WAD}$ (ppm) | $H_2O_2$: $CN_{WAD}$ MOLAR RATIO | $SO_2$: $CN_{WAD}$ MOLAR RATIO | RESIDUAL $CN_{WAD}$ (ppm) |
|---|---|---|---|---|
| Example 1 | 239.9 | 5:1 | 0 | 1.8 |
| Example 2 | 239.9 | 6:1 | 0 | <0.05 |
| Example 3 | 239.9 | 1:1 | 1:1 | 60.5 |
| Example 4 | 239.9 | 1:1 | 2:1 | 41.5 |
| Example 5 | 239.9 | 2:1 | 1:1 | 20.5 |
| Example 6 | 239.9 | 2:1 | 2:1 | 3.8 |
| Example 7 | 239.9 | 2:1 | 3:1 | 3.8 |
| Example 8 | 239.9 | 2.25:1 | 1:1 | 15.2 |

TABLE 1-continued

| EXAMPLE NO. | INITIAL $CN_{WAD}$ (ppm) | $H_2O_2$: $CN_{WAD}$ MOLAR RATIO | $SO_2$: $CN_{WAD}$ MOLAR RATIO | RESIDUAL $CN_{WAD}$ (ppm) |
|---|---|---|---|---|
| Example 9 | 239.9 | 2.25:1 | 1.66:1 | 0.02 |

TABLE 2

| EXAMPLE NO. | INITIAL $CN_{WAD}$ (ppm) | $H_2O_2$: $CN_{WAD}$ MOLAR RATIO | $SO_2$: $CN_{WAD}$ MOLAR RATIO | RESIDUAL $CN_{WAD}$ (ppm) |
|---|---|---|---|---|
| Example 10 | 100 | 6:1 | 0 | 4.32 |
| Example 11 | 100 | 8:1 | 0 | 0.02 |
| Example 12 | 100 | 3:1 | 0 | 16.64 |
| Example 13 | 100 | 3:1 | 0.75:1 | 0.07 |
| Example 14 | 100 | 2:1 | 0 | 18.10 |
| Example 15 | 100 | 2:1 | 1:1 | 0.1 |
| Example 16 | 100 | 1:1 | 0 | 37.8 |
| Example 17 | 100 | 1:1 | 1:1 | 6.96 |
| Example 18 | 100 | 1:1 | 1.5:1 | 0.1 |

TABLE 3

Results of Detoxification of CN with Hydrogen Peroxide and Sodium Sulfite

| EXAMPLE NO. | INITIAL $CN_{WAD}$ (ppm) | $H_2O_2$: $CN_{WAD}$ MOLAR RATIO | $Na_2SO_3$: $CN_{WAD}$ MOLAR RATIO | RESIDUAL $CN_{WAD}$ (ppm) |
|---|---|---|---|---|
| 19 | 100 | 7:1 | — | 0.74 |
| 20 | 100 | 1:1 | — | 16.55 |
| 21 | 100 | 1:1 | 1:1 | 13.31 |
| 22 | 100 | 1:1 | 2:1 | 8.6 |
| 23 | 100 | 1:1 | 3:1 | 8.4 |
| 24 | 100 | 1:1 | 4:1 | 8.4 |
| 25 | 100 | 2:1 | 1:1 | 1.65 |
| 26 | 100 | 2:1 | 2:1 | 0.52 |
| 27 | 100 | 3:1 | 1:1 | 0.36 |
| 28 | 100 | 3:1 | 2:1 | 0.16 |

What is claimed:

1. A process for detoxifying cyanide-containing effluents comprising adjusting the the pH of said effluent to a pH of 7.0 to 12.0, reacting said effluent with a sufficient amount of $H_2O_2$ and either $SO_2$ or an alkali/alkaline earth metal sulfite in order to convert said cyanide-containing effluents to effluents containing environmentally less toxic materials, wherein said $H_2O_2$ is present in a stoichiometric ratio of 1:1 to 3:1 of $H_2O_2$: cyanide, and said $SO_2$ or sulfite is present in a stoichiometric ratio of 1:1 to 3:1 of $SO_2$ or sulfite: cyanide.

2. The process according to claim 1 wherein said $H_2O_2$ is at a concentration of 35 to 90% by weight.

3. The process according to claim 2 wherein said $H_2O_2$ is at a concentration of 50 to 70% by weight.

4. The process according to claim 1 wherein said $H_2O_2$ and $SO_2$ or alkali/alkaline earth metal sulfite are reacted with said effluent simultaneously.

5. The process according to claim 1 where said effluent is reacted first with said $H_2O_2$ and subsequently with said $SO_2$ or alkali/alkaline earth metal sulfite.

6. The process according to claim 5, wherein the concentration of $H_2O_2$ in said effluent is 20-100 ppm when said $SO_2$ or alkali/alkaline earth metal sulfite is added.

7. The process according to claim 1 wherein said alkali/alkaline earth metal sulfite is selected from the group consisting of sulfites, bisulfites, metabisulfites, and pyrosulfites.

8. The process according to claim 1 wherein said process is a batch or continuous process.

9. The process according to claim 8 which further comprises adding a catalyst.

10. The process according to claim 9 wherein said catalyst is a copper (II) salt.

11. The process according to claim 10 wherein said copper (II) salt is copper (II) sulfate pentahydrate.

12. The process according to claim 8 wherein said $H_2O_2$ and $SO_2$ or alkali/alkaline earth metal sulfite are reacted with said effluent simultaneously.

13. The process according to claim 8 where said effluent is reacted first with said $H_2O_2$ and subsequently with said $SO_2$ or alkali/alkaline earth metal sulfite.

14. The process according to claim 13 wherein said $SO_2$ or alkali/alkaline earth metal sulfite is added 5 to 60 minutes subsequent to addition of said $H_2O_2$ to said effluent.

15. The process according to claim 1 further comprising initially adjusting the pH of said effluent to a pH of 8.5 to 9.5.

16. The process according to claim 1 wherein said $H_2O_2$ is an aqueous solution.

17. The process according to claim 1 wherein said $SO_2$ is in gaseous form.

18. The process according to claim 1 wherein said alkali/alkaline earth metal sulfite is added as an aqueous solution.

19. The process according to claim 1 wherein said effluent is an effluent generated from leaching of gold-containing ores.

20. The process according to claim 1, wherein the molar ratio between $H_2O_2$ and cyanide (CN−) is between about 2:1 and about 3:1.

21. A process for detoxifying cyanide-containing effluents consisting essentially of adjusting the pH of said effluent to a pH of 7.0 to 12.0, reacting said effluent with a sufficient amount of $H_2O_2$ and either $SO_2$ or an alkali/alkaline earth metal sulfite in order to convert said cyanide-containing effluents to effluents containing environmentally less toxic materials, wherein said $H_2O_2$ is present in a stoichiometric ratio of 1:1 to 3:1 of $H_2O_2$: cyanide, and said $SO_2$ or sulfite is present in a stoichiometric ratio of 1:1 to 3:1 of $SO_2$ or sulfite: cyanide.

* * * * *